(12) United States Patent
Yu

(10) Patent No.: US 8,097,973 B2
(45) Date of Patent: Jan. 17, 2012

(54) POWER MAINS TRANSFORMER DATA BRIDGE

(75) Inventor: Hong Yu, Hollis, NH (US)

(73) Assignee: Aboundi, Inc., Nashua, NH (US)

(*) Notice: Subject to any disclaimer, the term of this patent is extended or adjusted under 35 U.S.C. 154(b) by 359 days.

(21) Appl. No.: 12/380,657

(22) Filed: Mar. 3, 2009

(65) Prior Publication Data
US 2010/0225162 A1     Sep. 9, 2010

(51) Int. Cl.
*H02J 3/02* (2006.01)
(52) U.S. Cl. ............................................. 307/3; 455/402
(58) Field of Classification Search ........ 307/3; 455/402
See application file for complete search history.

(56) References Cited

U.S. PATENT DOCUMENTS

| | | | |
|---|---|---|---|
| 2,647,253 A | 7/1953 | Mackenzie | |
| 4,188,619 A | 2/1980 | Perkins | |
| 4,389,544 A * | 6/1983 | Wagner et al. | 370/294 |
| 4,458,236 A | 7/1984 | Perkins | |
| 6,091,779 A * | 7/2000 | Griessbach | 375/258 |
| 6,897,756 B2 * | 5/2005 | Haisch | 336/130 |
| 7,019,620 B2 * | 3/2006 | Bohler et al. | 340/12.38 |
| 7,148,799 B2 * | 12/2006 | Cern et al. | 340/538.16 |
| 2002/0121963 A1 | 9/2002 | Kline | |
| 2007/0213879 A1 | 9/2007 | Iwamura | |

* cited by examiner

*Primary Examiner* — Albert W Paladini
(74) *Attorney, Agent, or Firm* — Joanne M. Martin

(57) ABSTRACT

A circuit and system having an inductive data link from one or more user-side phases to a plurality of line-side phases by individual data transformers having a winding coupled to the particular phase by a high-permeability ferrite material. The resulting connection across the primary (or primaries) and secondary (or secondaries) selectively provides and efficient coupling of data in a multi-phase environment including step-down distribution transformers and "Δ"-to-"Y" configured circuits while maintaining isolation at the power line frequency. Further embodiments include transfer to selected phases or single-phase applications, and selective signal-pass or -reject filtering.

13 Claims, 3 Drawing Sheets

POWER MAINS TRANSFORMER DATA BRIDGE

FIELD OF THE INVENTION

The present invention relates to power mains data couplers, in particular, to data couplers providing a data path across multiphase transformers.

BACKGROUND OF THE INVENTION

Residential and commercial power distribution comprising AC power mains are typically optimized for efficiency of power distribution at the particular frequency, voltage and current of the end user in the particular power service area. As important is the need for flexibility to provide the various combinations of voltage and power for differing end users who may be juxtaposed. The typical U.S. distribution systems provide a three-phase "medium" voltage (10-30 KV) pole-to-pole line to which a first step-down to 480 V 3 phase for a drop to the large/commercial building is typically provided by pole transformers. In the building, the voltage is typically further dropped to 120/208 (3-phase) and distributed to neighboring and/or adjoining users, or alternately first distributed at 480V to neighboring users and the subsequently reduced to 120/208.

Increasingly for contemporary business and residential users, a separately wired data infrastructure is unattractive, inflexible or simply unavailable, and data over the power line (power mains) becomes interesting. However, blocks to effective power mains data transfer are the facility transformers, particularly the 3-phase 480-to-120/208 transformers that are used to provide the necessary voltage step-down. Furthermore, the final (480-to-120/208) step-down also often transforms the power distribution from 3-phase "Δ" (or "Y") format to 3-phase "Y" format, which further complicates data transfer on the power mains through the transformer.

SUMMARY

The present invention provides an inductive data link from one or more user-side phases to a plurality of line-side phases by individual data transformers having a winding coupled to the particular phase by a high-permeability ferrite material. The resulting connection across the primary (or primaries) and secondary (or secondaries) selectively provides and efficient coupling of data in a multi-phase environment while maintaining isolation at the power line frequency.

Further embodiments include transfer to selected phases or single-phase applications, and selective signal-pass or -reject filtering.

BRIEF DESCRIPTION OF THE DRAWING

These and further features of the present invention will be better understood by reading the following Detailed Description, together with the Drawing, wherein.

DETAILED DESCRIPTION

Figure 1:
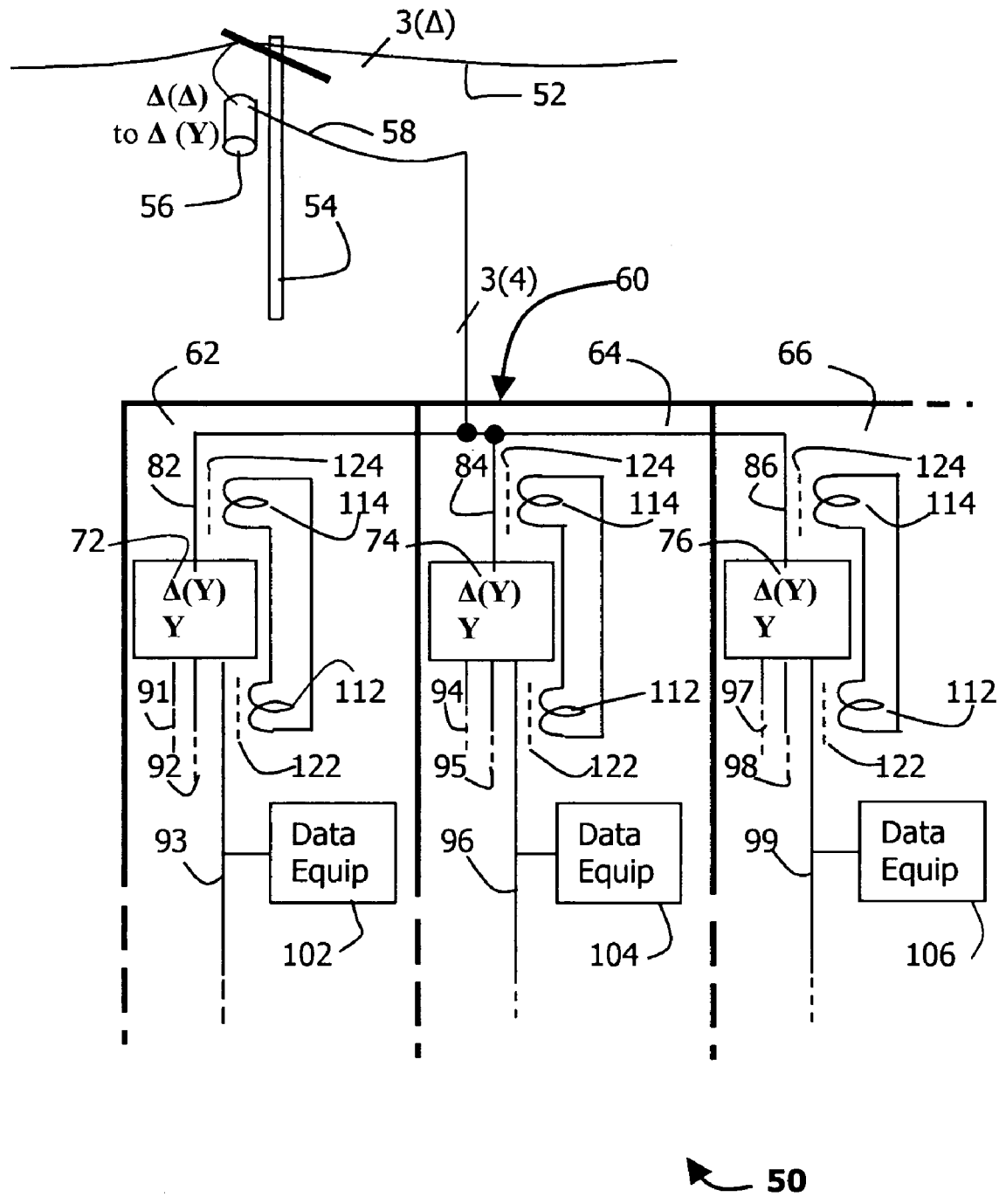
FIG. 1 is a block diagram of an exemplary multi-user power distribution system having data conductivity between the users.

A typical power multi-user distribution installation 50 is shown in FIG. 1, wherein a "medium" voltage (e.g. 10-30 KV) Δ 3-phase 3-wire power line 52 is carried by to the facility by a pole 54 which typically holds a 3-phase transformer 56 (or 3 each single phase transformers) having a secondary voltage of 480 volts distributed over a 3 wire, 3-phase Δ (or Y) drop 58 to the facility 60 which in the embodiment shown, distributes the 480V power to individual units 62, 64 and 66 each having a subsequent corresponding step-down transformer 72, 74 and 76 receiving the distributed 3 wire, 3-phase 480 V ("low" voltage) power into their respective primary winding connections 82, 84 and 86. Each unit 62, 64 and 66 transformer 72, 74 and 86 is typically a "Δ"-to-"Y" transformer provides a voltage step-down to a nominal 120 volts (low voltage) from a phase to the neutral wire, or nominally 208 volts from one phase to another. Shown separately and without the 'Y' neutral wire, the transformer 72, 74 and 76 secondary 3-phases correspond to paths 91, 92, 93; 94, 95, 96; and 97, 98, 99, respectively. Within each unit, the electrical loads are typically distributed as equally as possible over and among each of the 3-phases (e.g. paths 91, 92 and 93 have connected loads as equal as possible), wherein a data equipment, e.g. 102, 104 and 106 is connected to one of the phases 93, 96 and 99 respectively. The other loads and loads connected to the other phases (e.g. 91, 92, 94, 95, 97 and 98) typically exist but are not shown for clarity. Alternate embodiments include a "Δ"-to-"Y" pole transformer 58 and "Y"-to-"Y" transformers 72, 74 and 76 power distribution, discussed further below.

Figure 2:
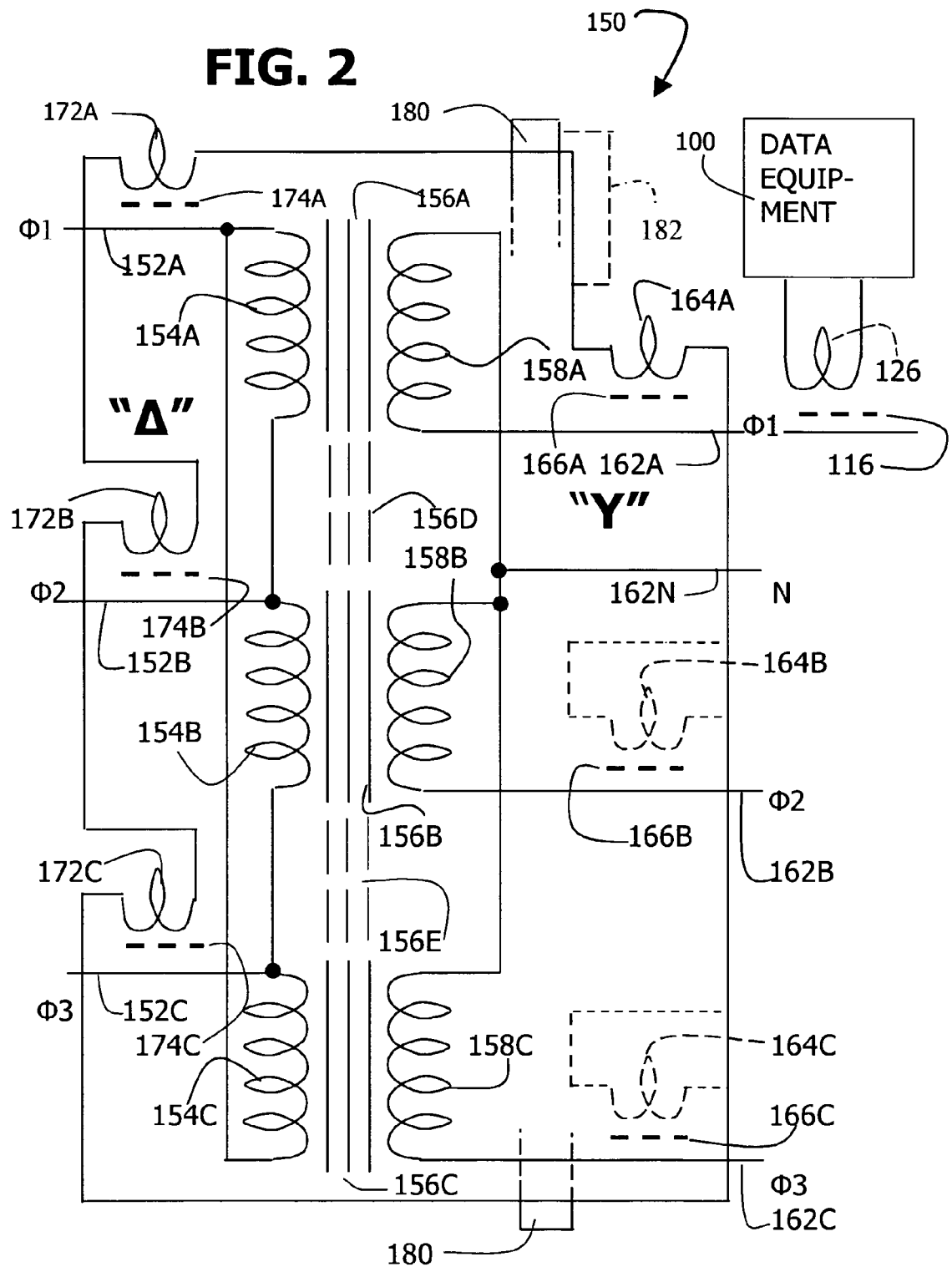
FIG. 2 is a schematic diagram of one embodiment according to the present invention having a "Δ" to "Y" transformer.

It is desirable to provide data communication between and among the data equipment 102, 104 and 106 over the power paths 93, 96 and 99 to each other, but a data path connection typically requires a pass through transformers 72, 74 and/or 76. According to one embodiment of the present invention, data is transferred around the transformers by a data link including a first data transformer comprising a winding 112 coupled to a representative secondary winding wire 93, 96 and/or 99 by a magnetic core 122 providing efficient signal transfer at data frequencies, typically comprising a ferrite core having a permeability in excess of 1,000, the present embodiment having a permeability in excess of 3000. Alternate embodiments include additional transformers 112 connected to each of the secondary phases discussed further in FIGS. 2 and 3, below, and according to a single core simultaneously coupling (e.g. surrounding) all secondary phase paths. The data path around each transformer 72, 74 and 76 is completed by connection to a primary-side transformer or transformers illustrated by winding 114 coupled to one or more of the primary phase wire with a corresponding magnetic core typically comprising substantially the same material as core 122, discussed above. In the embodiment 50 of FIG. 1, the windings 112 and 114 comprise relatively few turns of wire around or through the core, typically merely juxtaposing a single length of wire along the corresponding primary side wire 82, 84, 86 and surrounded by the core i.e. 122 or 124.

A more detailed view 150 of one embodiment according to the present invention showing a three-phase "Δ" input connection 152A, 152B and 152C to corresponding primaries 154A, 154B and 154C respectively coupled to corresponding secondary windings 158A, 158B and 158C via magnetic cores 156A, 156B and 156C and having a "Y" output configuration with each phase provided at connections 162A, 162B and 162C with a neutral connection 162N. In the embodiment shown, three separate, single phase transformers may be used, or the primary and secondary windings may share a common core as indicated by core elements 156D and 156E connecting the transformer cores 156A, 156B and 156C to provide a single, 3-phase transformer. With regard to a typical multi-user installation such as 50 illustrated in FIG. 1, the implementation 150 is replicated within each unit, 62, 62, 66, and so forth.

A typical illustration of data from or to the user side of the transformer is shown as being presented by a data equipment 100 having a data signal connected or coupled to the power mains path 162A inductively with a coil 126 and core 116; however other forms of coupling, e.g. capacitively (not shown) are within the scope of the present invention. Data is received from that power mains path 162A with a corresponding data winding 164A and core 166A, and connected to three series connected windings 172A, 172B and 172C, each coupled to a primary phase wire 152A, 152B and 152C. While it is preferable to have signal coupled to each of the primary phase connections as a single data coupled (e.g. with data winding 172A and core 174A) phase wire cannot be reliably connected to a corresponding signal-coupled primary lead of another unit transformer for transfer to data equipment in the corresponding unit, the present does include data coupling to selected primary winding wires less than each of the 3-phase wires, in such case the unused data windings (e.g. 172B and 172C) and corresponding cores 174B and 174C) would be omitted and the signal paths be connected to form a circuit. Similarly, additional data coupling to other secondary phase wires (e.g. 162B and 162C) is provided according to the present invention via additional series-connected corresponding windings 164B and 164C coupled by cores 166B and 166C. Furthermore, further alternate embodiments include parallel and series-parallel connected data windings (not shown).

Additional embodiments include a filter 180 disposed between the primary-side data windings (e.g. 172A, 172B, 172C) and secondary-side data windings (e.g. 164A, 164B and/or 164C) to provide a desired band-pass, band-reject, high-pass, low-pass, etc. control of data transferred in either or both directions, or differently in each direction. Moreover, according to further alternate embodiments, the filter 180 parameters may be set and/or dynamically adjusted by data signals via connection 182 received with the data winding(s) as introduced by the data equipment 100 or other corresponding equipment disposed in other units.

Figure 3:
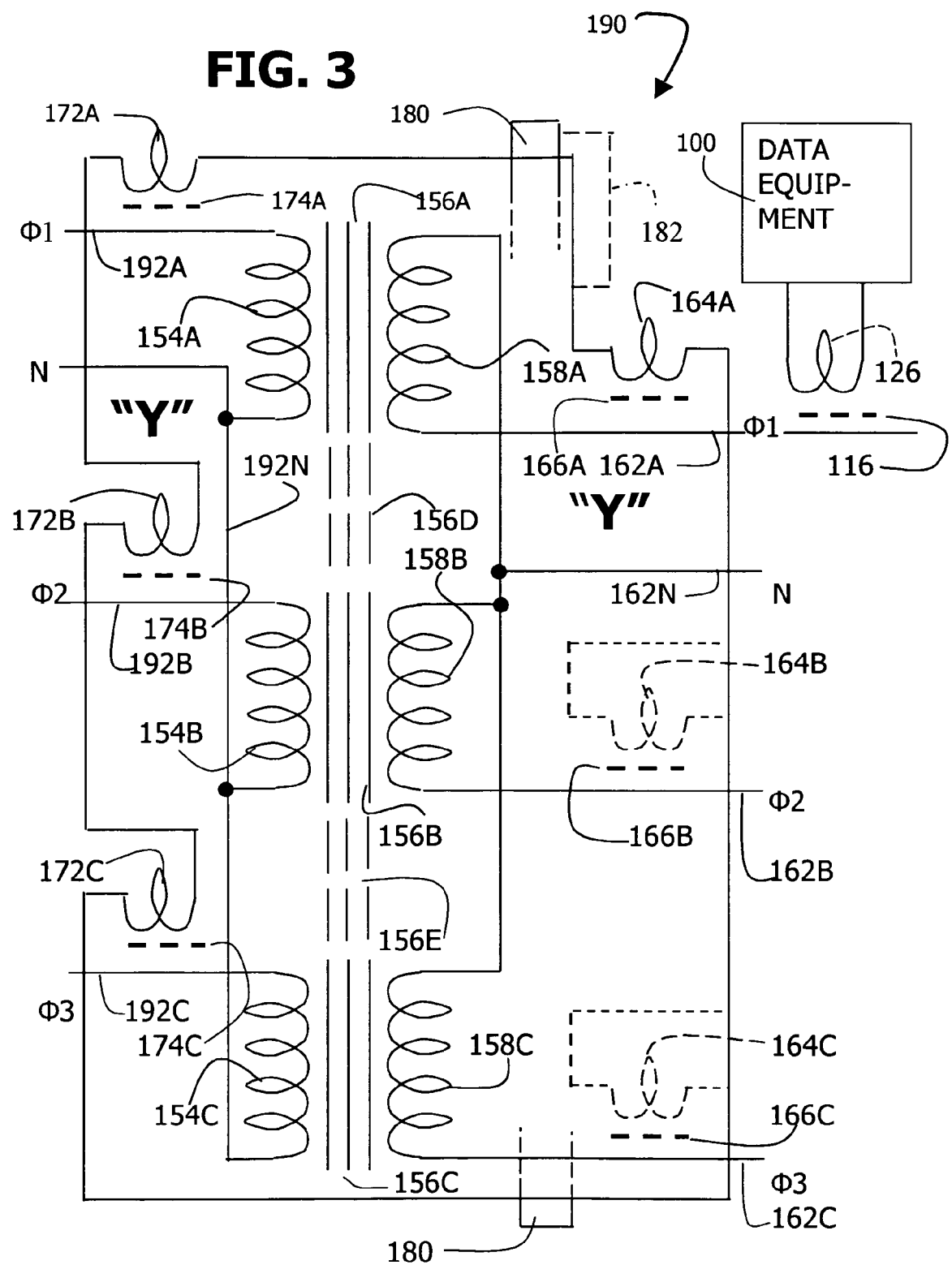
FIG. 3 is a schematic diagram of one embodiment according to the present invention having a "Y"-to-"Y" transformer.

A further alternate embodiment includes a "Y"-to-"Y" 480-to-120/208 Vac step-down transformer 190 shown in FIG. 3 typically located at the end-user's location, such as in the building and/or at each unit 62, 64 and 66 which receives a "Y" (4-wire) primary feed 58, such as from the pole transformer 56, which in this embodiment receives a "Δ" pole-to-pole primary feed, but delivers a "Y" step-down drop at 480 Vac to the next set of transformers 72, 74 and 76, which may comprise the exemplary transformer 190. The transformer and the related data link circuitry according to one embodiment of the present invention is substantially the same as provided for the transformer 150 shown in FIG. 2 and discussed above, with an exception being that the transformer 190 primary windings 154A, 154B and 154C are connected in a "Y" configuration to 3-phase leads 192A, 192B, 192C and neutral connection 192N, such that the data signals from the windings 172A, 172B and 172C are coupled to the 3-phase leads 192A, 192B and 192C. As with the prior embodiments, two such transformers having primary windings connected together to a common feed (e.g. 58) in the same or different locations will provide a data path from a secondary of one such transformer to the secondary of the second transformer, such as in adjacent units 64 and 66.

Other equipment such as distribution panels and circuit breakers are effectively included in the distribution layout but not shown, and are assumed to be in a closed-circuit ("on") state for the circuits illustrated with no impedance to data transfer therethrough. Further modifications and substitutions made by one of ordinary skill in the art are within the scope of the present invention which is not to be limited, except by the claims which follow.

What is claimed is:

1. A data coupling system for use with a transformer having a primary and a secondary, comprising:
    a first inductively coupled link disposed on a primary connection to provide a signal path to said primary; and
    a second inductively coupled link disposed on a secondary connection and to said signal path to provide a continuous data path from said primary to said secondary.

2. The system of claim 1, wherein said transformer comprises a multiphase transformer, and each said primary and said secondary comprises multiple windings, wherein at least one of said primary and said secondary windings have common connections.

3. The system of claim 2, wherein at least one of said primary and said secondary comprises a "Y" circuit.

4. The system of claim 3, wherein one of said first inductive and said second inductive link corresponding to said one of said primary and said secondary having a "Y" circuit, comprises a plurality of inductive links disposed on a non-common (opposite to commonly connected neutral) end of the corresponding "Y" windings.

5. The system of claim 2, wherein at least one of said primary and said secondary comprises a "Δ" circuit.

6. The system of claim 5, wherein one of said first inductive and said second inductive link corresponding to said one of said primary and said secondary having a "Δ" circuit, comprises a plurality of inductive links disposed on commonly connected ends of the corresponding "Δ" windings.

7. The system of claim 1, wherein said inductive link comprises a conductor disposed parallel to a transformer primary and secondary end and a high permeability magnetic core disposed about both said conductor and said end.

8. The system of claim 1, further including a filter disposed between said first inductively coupled link and said second inductively coupled link.

9. The system of claim 8, wherein said filter comprises at least one of a band-pass, band-reject, high-pass, low-pass, filter selected to control data transferred in at least one direction between said first inductively coupled link and said second inductively coupled link.

10. The system of claim 9, wherein parameters of said filter is selectively provided according to data provided by at least one of said first inductively coupled link and said second inductively coupled link.

11. A data coupling system for use with a multiple location step-down power distribution system, comprising:
    a plurality of transformers, each having a primary and a secondary, comprising:
        a first inductively coupled link disposed on a primary connection to provide a signal path to said primary; and
        a second inductively coupled link disposed on a secondary connection and to said signal path to provide a continuous data path from said primary to said secondary, wherein
        at least two of said transformers have a commonly connected primary windings, and wherein
        a data path is provided between each said secondary of said at least two transformers via said commonly connected primary windings.

12. The system of claim 11, wherein said transformer includes a "Y" connected 3-phase primary winding and a "Y"-connected 3-phase secondary winding.

13. The system of claim 11, wherein said transformer includes both a "Δ" connected 3-phase winding and a "Y"-connected 3-phase winding.

* * * * *